United States Patent
Volponi

(10) Patent No.: US 7,216,071 B2
(45) Date of Patent: May 8, 2007

(54) HYBRID GAS TURBINE ENGINE STATE VARIABLE MODEL

(75) Inventor: Allan J. Volponi, West Simsbury, CT (US)

(73) Assignee: United Technologies Corporation, Hartford, CT (US)

( * ) Notice: Subject to any disclaimer, the term of this patent is extended or adjusted under 35 U.S.C. 154(b) by 819 days.

(21) Appl. No.: 10/132,108

(22) Filed: Apr. 23, 2002

(65) Prior Publication Data

US 2003/0200069 A1 Oct. 23, 2003

(51) Int. Cl.
*G06G 7/48* (2006.01)

(52) U.S. Cl. .................. 703/7; 703/2; 703/6; 700/44; 700/48; 700/279; 701/100; 701/104; 701/106

(58) Field of Classification Search .............. 703/2, 703/6, 7, 22; 701/106, 100, 104; 700/44, 700/279
See application file for complete search history.

(56) References Cited

U.S. PATENT DOCUMENTS

| | | | |
|---|---|---|---|
| 4,411,595 A * | 10/1983 | Pisano ........................ | 416/1 |
| 5,925,089 A * | 7/1999 | Fujime ....................... | 701/106 |
| 6,063,129 A | 5/2000 | Dadd et al. | |
| 6,216,083 B1 * | 4/2001 | Ulyanov et al. ........... | 701/106 |
| 6,301,572 B1 * | 10/2001 | Harrison ..................... | 706/52 |
| 6,304,835 B1 * | 10/2001 | Hiramatsu et al. ......... | 703/7 |
| 6,415,272 B1 * | 7/2002 | Ulyanov ..................... | 706/2 |
| 6,609,060 B2 * | 8/2003 | Ulyanov et al. ........... | 701/106 |
| 6,718,252 B2 * | 4/2004 | Kawai et al. .............. | 701/104 |
| 6,823,675 B2 * | 11/2004 | Brunell et al. ............. | 60/773 |
| 6,909,960 B2 * | 6/2005 | Volponi et al. ........... | 701/100 |
| 6,985,781 B2 * | 1/2006 | Keeler et al. .............. | 700/44 |
| 7,020,595 B1 * | 3/2006 | Adibhatla et al. .......... | 703/7 |
| 7,058,556 B2 * | 6/2006 | Desai et al. ................ | 703/8 |
| 2002/0049526 A1 * | 4/2002 | Kawai et al. .............. | 701/104 |

(Continued)

FOREIGN PATENT DOCUMENTS

CA 02266282 * 3/1999

(Continued)

OTHER PUBLICATIONS

"Neural Modeling of Dynamic Systems with Nonmeasurable State Variables", Alippi et al, IEEE Transactions on Instrumentation and Measurement, vol. 48, No. 6, 1999.*

(Continued)

*Primary Examiner*—Fred Ferris
(74) *Attorney, Agent, or Firm*—Bachman & LaPointe

(57) ABSTRACT

The present invention relates to a system and a method for developing an engine model. The system broadly comprises a module for generating a state variable model of an engine, which module receives a plurality of inputs to an engine representative of a particular flight condition and generates a set of estimated engine parameters representative of the model. The system further comprises a comparator for comparing the set of estimated engine parameters to a set of measured engine parameters for generating a set of residuals and an artificial neural network module to be trained and to be used in an implementation configuration after training has been completed. The artificial neural network receives the set of residuals and the engine inputs during a training phase and generates a set of estimated residuals representative of the engine condition.

16 Claims, 2 Drawing Sheets

U.S. PATENT DOCUMENTS

| | | | |
|---|---|---|---|
| 2002/0087221 A1* | 7/2002 | Keeler et al. | 700/48 |
| 2003/0074171 A1* | 4/2003 | Desai et al. | 703/8 |
| 2003/0115037 A1* | 6/2003 | Sumida | 703/22 |
| 2005/0149234 A1* | 7/2005 | Vian et al. | 700/279 |

FOREIGN PATENT DOCUMENTS

| | | |
|---|---|---|
| JP | 2001-174366 | 6/2001 |

OTHER PUBLICATIONS

"Using Neural Networks for Sensor Validation", Mattern et al, NASA /TM-1998-208483, AIAA-98-3547, 1998.*

"Neural Network Based Modeling of a Large Steam Turbine-Generator Rotor Body Parameters fro On-line Distributed Data" Karayaka et al, IEEE Transactions of Energy Conversion, vol. 16, No. 4, Dec. 2001.*

* cited by examiner

HYBRID GAS TURBINE ENGINE STATE VARIABLE MODEL

BACKGROUND OF THE INVENTION

The present invention relates to a system and a method for developing an engine model.

Gas turbine state variable models (SVM) have long been employed to support the design, development, and testing of modern full authority digital engine controls (FADECS) as well as applications requiring real-time deployment of an engine model. Referring now to FIG. 1, the SVM 10 is a piecewise linear engine model representation. For control law applications, this allows a simple system identification to be performed in terms of transfer functions which in turn are used to determine the control gains and compensation for the various control loops that will govern the engine operation. This is performed across the flight envelope. Thus, the SVM must be representative of the engine dynamics at altitude as well as at sea level static conditions. This requirement is fulfilled by providing engine numerics at sea level as well as at several discrete altitude-Mach number combinations and by modeling the SVM in terms of corrected or referred parameters. Since SVM's are fairly simple models, they do not impose a computational burden and are favorably suited for real-time applications. This feature makes the SVM ideal for the applications mentioned above.

The SVM engine model typically consists of an n state piecewise linear structure which is valid across a flight envelope ranging from sea level static to approximately 50,000 feet altitude. The model states typically include the engine's shaft rotor speeds as well as several metal temperatures with the hot section modules (turbines and combustor) and high pressure compressor. The states, along with the output engine parameters being modeled (as well as their associated numerics) are expressed in terms of (standard day) corrected parameters and as such the model remains valid at non-International Standard Atmosphere (ISA) conditions. Appropriate correction factors are applied to inputs to correct parameters upon entering the model and the same correction applied in reverse to UN-correct the outputs. This process is depicted in FIG. 1.

The SVM consists of a linear state variable model described by a set of first order differential equations. In general, the outputs (y) of the gas turbine engine may be considered to be a nonlinear function of its inputs (u) and states (x), i.e.

$$\dot{x}=f(x,u),\ y=g(x,u)$$

This implies that:

$$d\,x=\left(\frac{\partial f}{\partial x}\right)d\,x+\left(\frac{\partial f}{\partial u}\right)d\,u \Rightarrow \Delta x \approx A\Delta x+B\Delta u$$

$$d\,y=\left(\frac{\partial g}{\partial x}\right)d\,x+\left(\frac{\partial g}{\partial u}\right)d\,u \Rightarrow \Delta y \approx C\Delta x+D\Delta u$$

where A, B, C, and D are matrices of partial derivates and $\Delta x$ and $\Delta u$ are deltas from steady state conditions of the engine states and inputs, respectively. The steady state parameter values and partial derivatives are determined through small signal perturbation of a nonlinear model of the engine, for example a state of the art performance program. These equations are directly modeled within the SVM 10. The steady state baselines and partial derivatives are scheduled as a function of engine power (typically N2) and flight condition. For the latter, Reynold's Index may be used which combines the effects of altitude and Mach number. Reynold's Index is computed as $Rel=\delta/\theta^{1.25}$. The flight envelope for which the engine numerics within the SVM 10 are represented is whatever is typical for the engine in question.

The engine model structure described above generally provides an adequate model for steady state and slow transient operation. For rapid transients or operation across a wide power range (e.g. idle to takeoff), the SVM admits a much greater error. For the purpose of parameter synthesis during these types of transients, this level of error is generally unacceptable. To mitigate the transients effects, an adaptable SVM such as that shown in FIG. 2 is essential.

One adaptable SVM technique which has been used with success is to provide a Kalman filter (KF) observer 12 which acts upon the residuals (r) formed by the output P of the SVM 10 and the actual observed measurements P from the engine 14 to provide a set of tuners ($\hat{x}$) which adapt the SVM 10 to match the actual observations (hence driving the residuals to zero on the average). The tuners ($\hat{x}$) consist of a set of engine module performance parameters such as efficiencies and flow parameters which allow the engine states and output parameters to be adjusted to allow a more faithful match to the actual engine.

A drawback of the adaptable SVM model shown in FIG. 2 is that the steady state level of the tuners may take on an unreasonable level in order to adapt a particularly deficient SVM model to a particular engine or engine type during development.

What is needed is a system architecture and a method to initialize the SVM to reflect a given initial state (in terms of the efficiencies and flow parameters) so that at installation the revised adaptable SVM matches the real engine in terms of generating average zero residuals as well as admitting the specified initial engine state.

SUMMARY OF THE INVENTION

Accordingly, it is an object of the present invention to provide a system architecture and a method for initializing a SVM to reflect a given initial state so that an adaptable SVM matches the real engine in terms of generating average zero residuals.

The foregoing object is attained by the system and method of the present invention.

In accordance with the present invention, a system for developing an engine model is provided. The system broadly comprises a module for generating a state variable model of an engine, which module receives a plurality of inputs to an engine representative of a particular flight condition and generates a set of estimated engine parameters representative of the model. The system further comprises means for comparing the set of estimated engine parameters to a set of measured engine parameters for generating a set of residuals and an artificial neural network module. During training, the artificial neural network module receives the set of residuals and the engine inputs and generates a set of estimated residuals for the particular flight condition.

A method for developing an engine model broadly comprises providing a module for generating a state variable engine model, inputting a set of engine inputs representative of a particular flight condition into said state variable engine model module and generating a set of estimated engine parameters, comparing the set of estimated engine parameters to measured engine parameters and generating a set of residuals, providing an artificial neural network module, and training the artificial neural network module using the engine inputs and the residuals. The method further comprises using the artificial neural network after training has been completed to implement a system for using an engine model.

Other details of the hybrid gas turbine engine state variable model of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
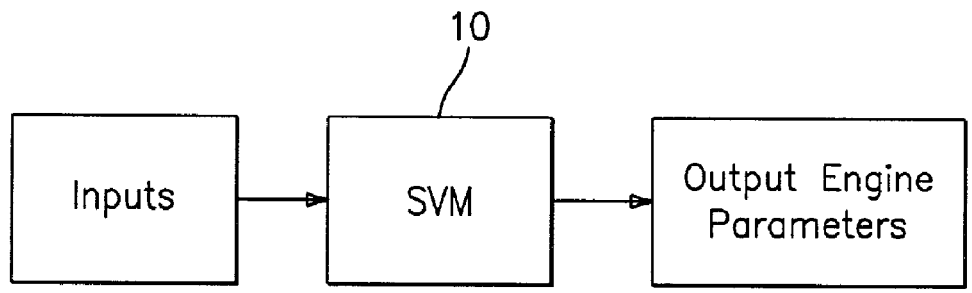
FIG. 1 is a schematic representation of a prior art general state variable model structure.
Figure 2:
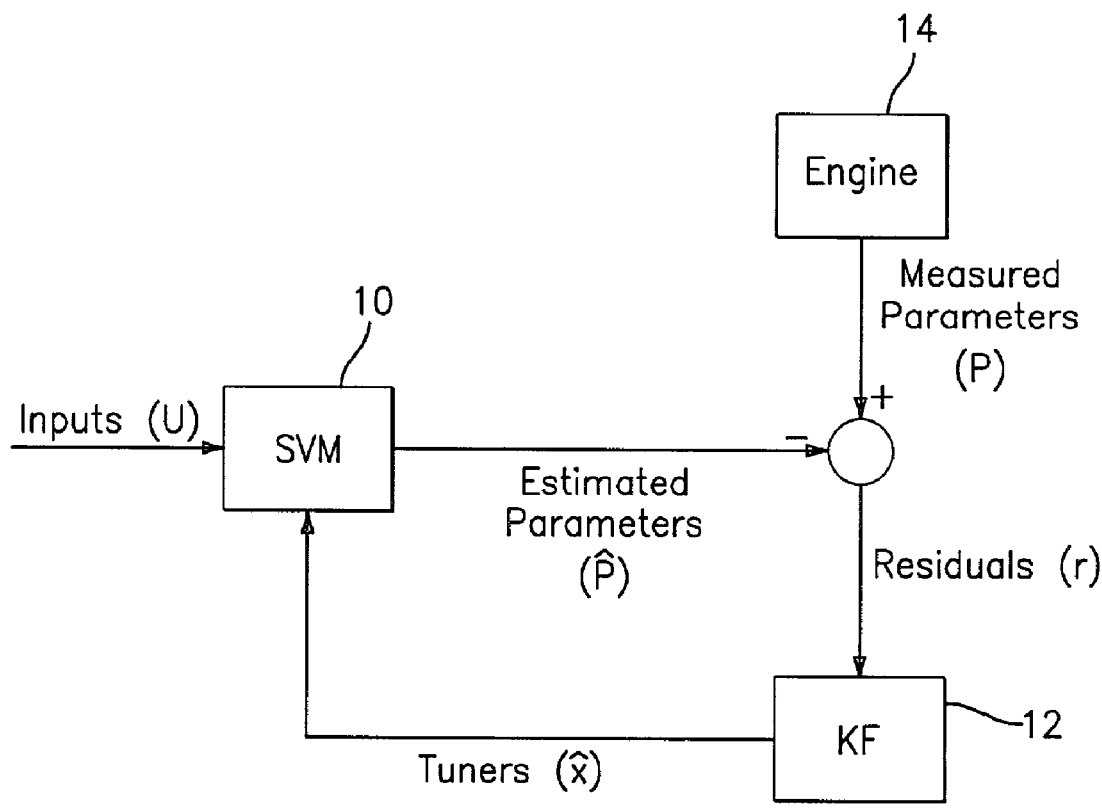
FIG. 2 is a schematic representation of a prior art adaptable state variable model structure.
Figure 3:
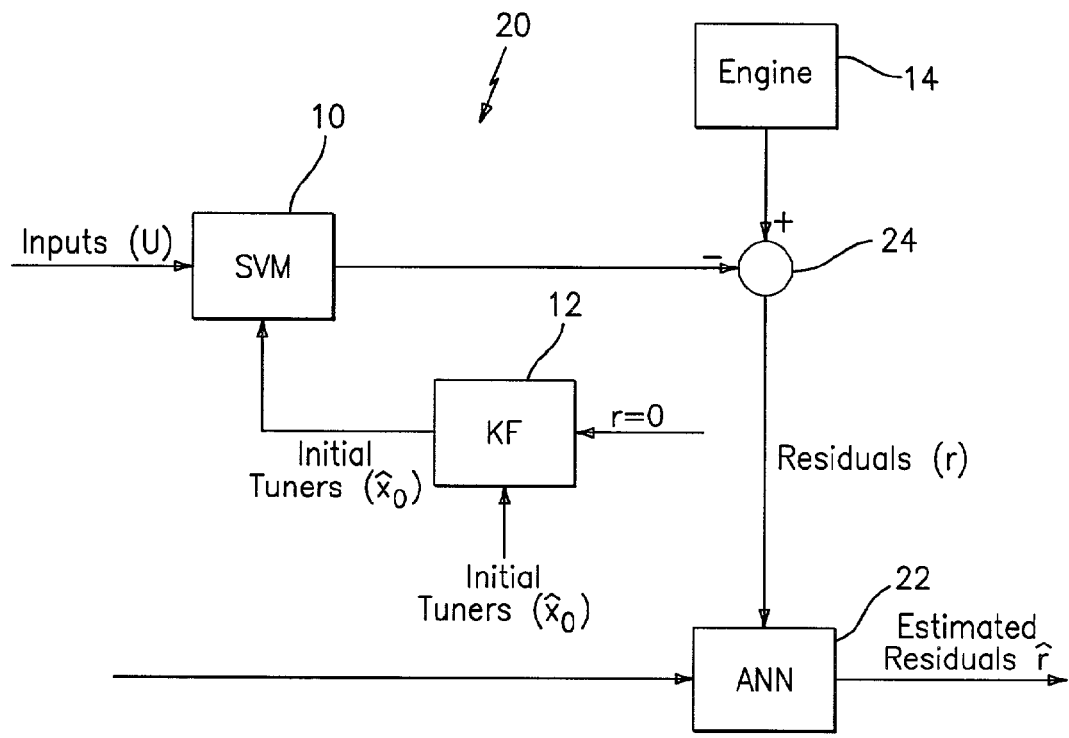
FIG. 3 is a schematic representation of a system architecture for a training implementation of a state variable model in accordance with the present invention.

Referring now to the drawings, FIG. 3 illustrates a system 20 during a training phase of an improved adaptable SVM model generator. The system 20 includes a module 10 for generating a state variable model of the engine 14. The module 10 is implemented by a pre-programmed computer. The model generated by the module 10 may be generated using any suitable n state piecewise linear structure known in the art. As before, a number of engine parameters are inputted into the module 10. The inputs (u) represent a particular flight condition for the engine. The inputs (u) may vary from engine to engine model, but typically will take the form of parameters such as fuel flow, variable geometry position such as variable stator vane position, stability bleed commands, various accessory bleeds, horsepower extraction, and other parameters necessary to drive the models. Environmental factors such as ambient temperature, pressure, Mach number, altitude, and throttle position may also be inputted.

The system 20 further has an artificial neural network 22 implemented by the pre-programmed computer. The artificial neural network 22 is to be trained for a specified fixed initial engine state to learn the difference between the model generated by the module 10 and the real engine 14 under consideration. The artificial neural network 22 may have any desired architecture. For example, it may have an input layer, an output layer, and a number of hidden layers. Each of the layers may have a plurality of nodes which may connected in any desired manner. The neural network 22 receives the same inputs as the state variable model module 10. Depending on the configuration of the neural network 22, additional inputs may be used to perform a sort of regime classification to make the modeling easier.

The system 20 further has a Kalman filter observer module 12 for supplying a set of initial tuners ($\hat{x}_0$) to the module 10 to update the state variable engine model. The Kalman filter observer module 12 may comprise any suitable Kalman filter observer construction known in the art and may also be implemented by the pre-programmed computer. The initial tuners $\hat{x}_0$ are a user specified vector of initial tuner values. The tuners within the model typically take the form of changes in engine component efficiencies, flow capacities, and turbine nozzle areas. The initial value could be a vector of zeros for instance which would imply that the assumed state of the engine is nominal, i.e. zero delta form reference with the reference being a reference engine, such as the average production engine. Alternatively, the vector could be non-zero if there was some information known or assumed regarding the particular engine 14 under consideration. As noted in FIG. 3, the residuals supplied to the Kalman filter observer module 12 are initially zero.

The system 20 further has a comparator 24. The comparator 24 receives the output of the state variable engine model module 10 and the measured parameters P from the engine 14 and generates a set of residuals (r) which are supplied to the neural network 22. The neural network 22 is programmed to generate a plurality of estimated residuals $\hat{r}$.

During the training mode, the estimated residuals ($\hat{r}$) are compared to the actual residuals (r) to produce an error term. The training is continued until the error is sufficiently small or is not changing with additional training. The error is a measure of how well one has mapped the residual difference between the real engine 14 and the state variable engine model module 10 output with a fixed initial tuner vector. After the artificial neural network 22 has been trained to statistically represent the residuals produced between the existing state variable engine model and the real engine under a wide range of steady state operating conditions, an extended adaptable state variable engine model can be implemented as shown in FIG. 4.

Figure 4:
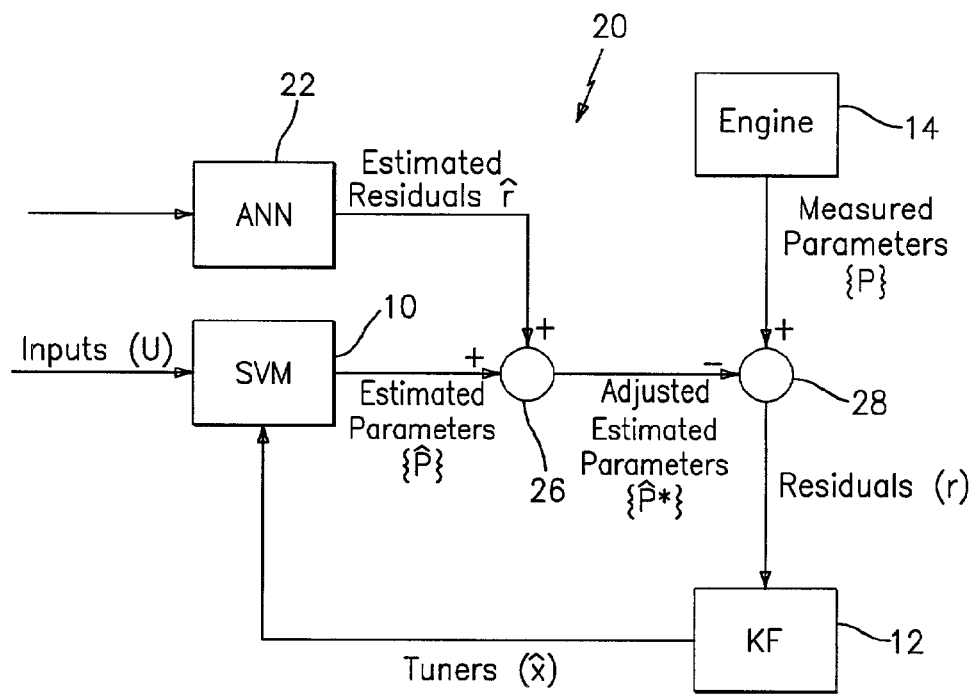
FIG. 4 is a schematic representation of a system architecture for an implementation version of an extended adaptable state variable model in accordance with the present invention.

FIG. 4 illustrates the system 20 in an implementation mode. As can be seen from this figure, the system 20 constitutes a hybrid model utilizing a physics based component (the module 10) and an empirical component (the neural network 22). In this implementation mode, the state variable engine model module 10 is supplied with the engine inputs (u), as well as a set of tuners $\hat{x}$ from the Kalman filter observer module 12, and is used to generate a plurality of estimated parameters $\hat{P}$. The neural network 22 receives the same inputs supplied to the module 10 and is used to generate a set of estimated residuals $\hat{r}$. The estimated residuals $\hat{r}$ and the estimated parameters $\hat{P}$ are inputted to a comparator 26. The comparator 26 generates a set of adjusted estimated parameters P*. The adjusted estimated parameters P* and the measured engine parameters P are fed to a second comparator 28. The second comparator 28 uses these inputs to generate a set of residuals r which are supplied to the Kalman filter observer module 12.

As can be seen from FIG. 4, the output of the system 20 in the implementation mode is internal to the system. The artificial neural network empirical element in the system 20 accounts for the initial difference between the actual engine and the model with assumed initial tuner vector. This configuration has the advantage of relieving the tuners from absorbing the model error and allows the tuners to track component performance degradation of the engine 14 over time in terms of efficiencies and the like. The system 20 shown in FIGS. 3 and 4 more accurately reflects the real engine.

The system 20 may be used in control law design and development such as control loop compensation determination, real time engine for dry bench test, real time engine for wet bench test, and aid in fuel metering unit (FMU) development/test. The system 20 may also be used in real-time engine parameter synthesis such as FADEC fault accommodation logic and virtual sensors. The system 20 may also be used in engine performance diagnostics for long term deterioration trending and/or event detection.

The comparators 24, 26, and 28 may also be implemented using a pre-programmed computer.

It is apparent that there has been provided in accordance with the present invention a hybrid gas turbine engine state variable model which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. A system for developing an engine model comprising:
   a computer processing unit;
   said computer processing unit including a module for generating a state variable model of an engine, said module receiving a plurality of inputs to an engine representative of a particular flight condition and generating a set of estimated engine parameters representative of said engine model;
   said computer processing unit further including means for comparing said set of estimated engine parameters to a set of measured engine parameters for generating a set of residuals; and
   said computer processing unit further including a neural network module for receiving said set of residuals and said engine inputs during a training phase and generating a set of estimated residuals.

2. A system according to claim 1, further comprising a Kalman filter module for generating a set of initial tuners and means for supplying said set of initial tuners to said state variable model module during said training phase.

3. A system according to claim 1, further comprising means for comparing said estimated residuals generated by said neural network module for a particular set of flight conditions with said set of estimated parameters generated by said state variable model module and for generating a set of adjusted estimated parameters.

4. A system according to claim 3, further comprising means for comparing said set of adjusted estimated parameters with said measured parameters to generate a revised set of residuals.

5. A system according to claim 4, further comprising a Kalman filter module for receiving said revised set of residuals and for converting said residuals to a revised set of tuners.

6. A system according to claim 5, further comprising means for supplying said revised set of tuners to said state variable model module so that said state variable model module generates a revised set of estimated parameters.

7. A computer implemented method for developing an engine model comprising:

(a) providing a computer module for generating a state variable engine model;

(b) inputting a set of engine inputs representative of a particular flight condition into said state variable engine model computer module and generating a set of estimated engine parameters;

(c) comparing said set of estimated engine parameters to measured engine parameters and generating a set of residuals;

(d) providing an artificial neural network module; and (e) training said artificial neural network module using said engine inputs to said state variable engine model module and said residuals.

8. A method according to claim 7, further comprising:

(f) providing a Kalman filter module:

(g) generating a set of initial tuners with said Kalman filter module; and (h) supplying said set of initial tuners to said state variable engine model module.

9. A method according to claim 8, further comprising:

(i) changing the engine inputs to said state variable engine model module and said artificial neural network to represent another flight condition; and (j) repeating steps (c) and (e).

10. A method according to claim 9, further comprising changing inputs to said Kalman filter module and generating a new set of initial tuners for said another flight condition.

11. A method according to claim 7, further comprising: (k) generating a set of estimated residuals with said artificial neural network after said training has been completed; and (l) comparing said estimated residuals with said estimated parameters generated by said state variable engine model module and generating a set of adjusted estimated parameters.

12. A method according to claim 11, further comprising:

(m) comparing said adjusted estimated parameters to said measured engine parameters and generating a set of revised residuals.

13. A method according to claim 12, further comprising:

(n) supplying said set of revised residuals to a Kalman filter observer module and generating a revised set of tuners with said Kalman filter observer module.

14. A method according to claim 13, further comprising:

(o) supplying said revised set of tuners to said state variable engine model module and generating a new set of estimated parameters.

15. A method according to claim 14, further comprising repeating steps (l), (m), and (n) using said new set of estimated parameters.

16. The method of claim 7, further comprising using said model to track component performance degradation of an engine.

* * * * *